United States Patent [19]

Miyata et al.

[11] Patent Number: 4,672,925
[45] Date of Patent: Jun. 16, 1987

[54] TWO-CYCLE ENGINE

[75] Inventors: Takahide Miyata, Kawagoe; Kanau Iwashita, Sakado; Kazuman Taniuchi, Fujisawa; Hitoshi Yamamoto, Shiki; Katsuhiro Nakamichi, Asaka, all of Japan

[73] Assignee: Honda Giken Kogyo Kabushiki Kaisha, Japan

[21] Appl. No.: 837,416

[22] Filed: Mar. 7, 1986

[30] Foreign Application Priority Data

| Mar. 9, 1985 [JP] | Japan | 60-47291 |
| Aug. 2, 1985 [JP] | Japan | 60-119668 |
| Aug. 28, 1985 [JP] | Japan | 60-131224 |
| Sep. 25, 1985 [JP] | Japan | 60-211918 |

[51] Int. Cl.$^4$ ............................................. F02B 75/02
[52] U.S. Cl. ................................ 123/65 PE; 123/65 V
[58] Field of Search ............ 123/65 PE, 65 V, 65 P, 123/65 PD, 65 EM

[56] References Cited

U.S. PATENT DOCUMENTS

| 4,121,552 | 10/1978 | Mithuo et al. | 123/65 PE |
| 4,285,311 | 8/1981 | Ito | 123/73 R |
| 4,321,893 | 3/1982 | Yamamoto | 123/65 PE |
| 4,341,188 | 7/1982 | Nerstrom | 123/65 PE |
| 4,364,346 | 12/1982 | Shiohara | 123/65 PE |
| 4,368,703 | 1/1983 | Shibata | 123/65 PE |
| 4,391,234 | 7/1983 | Holzleitner | 123/65 PE |

FOREIGN PATENT DOCUMENTS

| 0141650 | 5/1985 | European Pat. Off. | 123/65 PE |
| 0126812 | 10/1979 | Japan | 123/65 V |
| 0158514 | 12/1979 | Japan | 123/65 PE |

Primary Examiner—Craig R. Feinberg
Assistant Examiner—David A. Okonsky
Attorney, Agent, or Firm—Darby & Darby

[57] ABSTRACT

A two-cycle engine includes a port timing control device for varying a timing of the opening of an exhaust port by a piston. The port timing control means includes a first valve mounted within an exhaust passage adjacent to an upper end of the exhaust port and having a port timing control surface, a second valve mounted on a cylinder block between a cylinder head and the first valve and having a closure surface, and an urging member acting on the second valve to always urge it against the first valve. The first valve is operable to be angularly moved about an axis generally perpendicular to the axis of a cylinder into and out of an extended position where the control surface is disposed slightly below the upper end of the exhaust port to close a part of the exhaust port. The second valve is movable along a generally straight path into and out of an extended position where the closure surface closes that portion of the exhaust port lying between the upper end of the exhaust port and the first valve. The second valve is movable in synchronism with the angular movement of the first valve through the urging member.

11 Claims, 20 Drawing Figures

TWO-CYCLE ENGINE

BACKGROUND OF THE INVENTION

1. Field of the Invention

This invention relates generally to two-cycle engines and more particularly to two-cycle engines with means for varying a port timing in accordance with the engine speed to improve power output.

2. Prior Art

Generally, engines for vehicles or the like are broadly classified into two types, that is, a low engine speed type designed to achieve good power characteristics at a lower engine speed and a high engine speed type designed to have good power characteristics at a higher engine speed. An engine of the former type achieves the maximum power output in a lower range of the engine speed as indicated by a curve A in FIG. 1 while an engine of the latter type achieves the maximum power output in a higher range of the engine speed as indicated by a curve B. As can be seen from FIG. 1, the low speed-type engine fails to output a sufficient power in the higher engine speed range while the high speed-type engine produces a less power output in the lower engine speed range in comparison with the lower speed-type. In view of these, it has been proposed to control or vary an exhaust port timing in accordance with the engine speed to improve power output over an entire effective range of the engine speed. One conventional port timing control device for a two-cycle engine as disclosed in Japanese Patent Publication No. 4736047 comprises a port timing control valve comprising an elongated valve element of an arcuate plate and a lever carrying at one end the valve element and pivotally mounted on an upper portion of a wall of the exhaust passage, so that the valve element is movable between an open position where the valve element is received in a recess formed in a lower portion of the wall of the exhaust passage and a closed position where the valve element closes an upper portion of the exhaust port to delay an exhaust timing. The valve is in its closed position in a low engine speed range and is in its open position in a high engine speed range. A high speed-type engine equipped with this conventional port timing control valve can provide an improved power output in a low engine speed range as compared with a high speed type engine with no such control valve, but can not still improve its power output to a degree to which a low speed-type engine achieve it, as indicated by a curve C in FIG. 1. The reason for this is that when the valve element is in its closed position to close the upper portion of the exhaust port in the low engine speed range, the recess in the wall of the exhaust passage offers a resistance to the flow of the exhaust gas from the exhaust port. In addition, when the control valve is in its open position with the valve element received in the recess, the pivotal lever extends through the exhaust passage diametrically thereof adjacent to the exhaust port and therefore affects the smooth flow of the exhaust gas from the exhaust port.

SUMMARY OF THE INVENTION

It is therefore an object to provide a two-cycle engine having port timing control means by which the engine can produce an improved power output over an entire effective range of the engine speed in a reliable manner.

According to the present invention, there is provided a two-cycle engine comprising:

(a) a cylinder block having a cylinder head thereon, said cylinder block having a cylinder having an axis, an exhaust port being formed in a side wall of said cylinder and having opposite ends spaced along the axis of said cylinder, and said cylinder block having an exhaust passage communicating with said exhaust port;

(b) a piston received in said cylinder for reciprocal movement along the axis of said cylinder for closing and opening said exhaust port; and (c) port timing control means for varying a timing of the opening of said exhaust port by said piston, said port timing control means comprising (i) a first valve mounted within said exhaust passage adjacent to one end of said exhaust port closer to said cylinder head and having a port timing control surface, (ii) a second valve mounted on said cylinder block between said cylinder head and said first valve and having a closure surface, and (iii) urging means acting on said second valve to always urge it against said first valve, said first valve being operable to be angularly moved about an axis generally perpendicular to the axis of said cylinder into and out of an extended position where said control surface of said first valve is disposed slightly below said one end of said exhaust port to close a part of said exhaust port, said second valve being movable along a generally straight path into and out of an extended position where said closure surface closes that portion of said exhaust port lying between said one end of said exhaust port and said first valve, said second valve being movable in synchronism with the angular movement of said first valve through said urging means.

According to another aspect of the present invention, the urging means is replaced by linkage means operatively connecting the first valve to the second valve to effect the synchronous movements of the first and second valves.

DESCRIPTION OF THE PREFERRED EMBODIMENTS OF THE INVENTION

Figure 1:
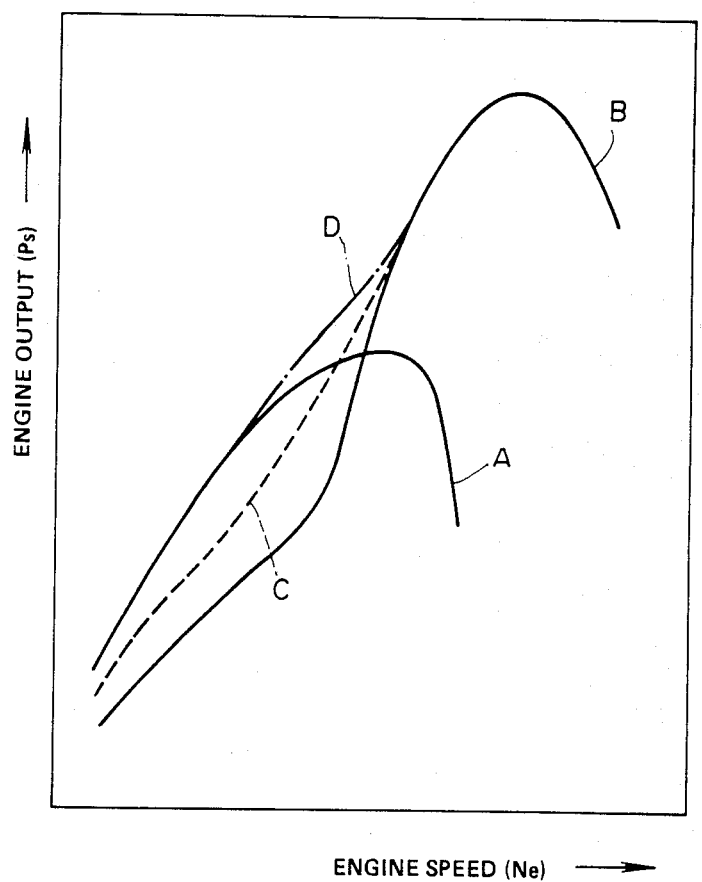
FIG. 1 is a diagrammatical illustration showing the relation between the engine speed and engine output.

The invention will now be described with reference to the drawings in which like reference numerals denote corresponding parts in several views.

Figure 2:
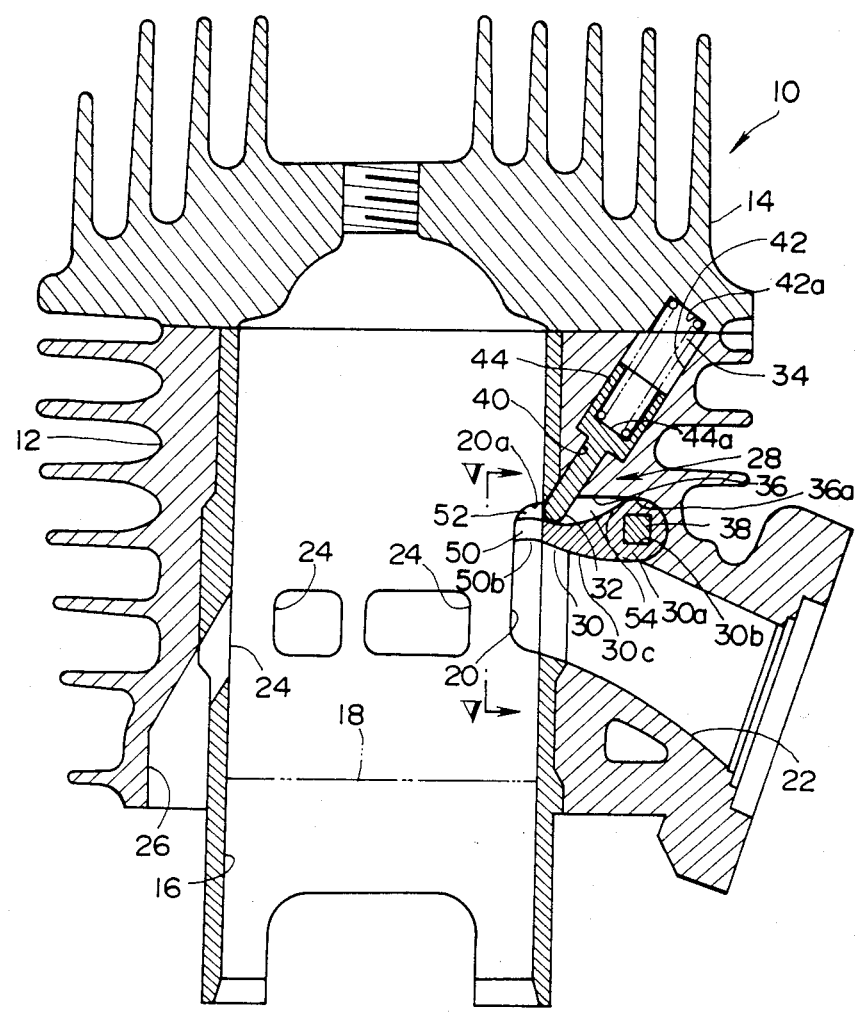
FIG. 2 is a cross-sectional view of a portion of a twocycle engine provided in accordance with the present invention.

FIG. 2 shows a portion of a two-cycle internal combustion engine 10 which comprises a cylinder block 12 having a cylinder head 14 thereon, the block having a cylinder 16. A piston 18, shown in a dots-and-dash line, is received in the cylinder 16 for reciprocal movement therealong. An exhaust port 20 is formed in a side or peripheral wall of the cylinder 16 and has upper and lower ends or edges spaced along the axis of the cylinder 16. An exhaust passage 22 is formed in the cylinder block 12 and opens to the exhaust port 20 at one end thereof. A plurality of scavenge ports 24 are formed in the peripheral wall of the cylinder 16 in circumferentially spaced relation and communicate with a crankcase chamber through respective scavenge passages 26. The exhaust port 20 and the scavenge ports 24 are opened and closed by the peripheral surface of the piston 18 moving along the cylinder 16 as is well known in the art.

Port timing control means is provided for varying an exhaust port timing, that is, a timing of the opening of the exhaust port 20 by the piston 18, in accordance with the engine speed. The port timing control means comprises a first valve 30, a second valve 32 disposed above the first valve 30 and urging means 34 urging the second valve 32 against the first valve 30 as hereinafter more fully be described. A recess 36 is formed in an upper wall of the exhaust passage 22 immediately adjacent to the exhaust port 20 and extending transversely of the cylinder 16. The recess 36 has a crosssectionally semicircular receptive portion 36a at an outer end thereof remote from the exhaust port 20. The first or flat valve 30 in the form of a plate is received in the recess 36 and has at an outer end a tubular portion 30a having a bore 30b of a square cross-section which tubular portion is received in the receptive portion 36a of the recess 36. A drive shaft 38 is rotatably mounted on the cylinder block 22 and is fitted in the bore 30b of the tubular portion 30a, so that the first valve 30, disposed transversely of the cylinder 16, is angularly movable with the drive shaft 38. The drive shaft 38 having an axis of rotation disposed perpendicular to the axis of the cylinder 16.

A guide hole 40 of an arcuate cross-section is formed in the cylinder block 12 and extending upwardly from the recess 36 in inclined relation to the axis of the cylinder 16, the guide hole 40 opening to the recess 36 adjacent to the exhaust port 20. The second valve 32 in the form of an arcuate plate is received in the guide hole 40 for sliding movement therealong. Another guide hole 42 of a circular crosssection is also formed in the cylinder block 12 and the cylinder head 14 and is continuous with the first-mentioned guide hole 40. The second valve 32 has an integral tubular portion 44 at an upper end thereof remote from the recess 36, the tubular portion 44 being disposed centrally of the width the second valve 32. The tubular portion 44 is received in the guide hole 42 for sliding movement therealong. The urging means 34 in the form of a compression coil spring 46 is mounted within the guide hole 42 and acts between an upper wall 42a of the guide hole 42 and an end wall 44a of the tubular member 44 to always urge the lower end of the second valve 32 downwardly into sliding contact with an upper surface of the first valve 30 adjacent to an inner end thereof. By virtue of the provision of the coil spring 34, the second valve 32 is moved in unison with the first valve 30. The urging means 34 may be any other suitable spring means such as a torsion spring.

Figure 3:
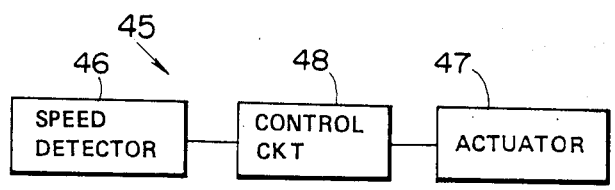
FIG. 3 is a block diagram of drive means for port timing control means.

As shown in FIG. 3, drive means 45 comprises a speed detector 46 for detecting the engine speed, an actuator 47 such a motor of the reversible type, and a control circuit 48 responsive to a detection signal from the speed detector 46 to control the operation of the actuator 47. The actuator 47 is operatively connected to the drive shaft 38 for angularly moving the shaft 38 about its axis through a predetermined angle. The drive means 45 may comprise a centrifugal governor operatively connected to a crankshaft (not shown) of the engine 10 and is operated when the engine speed exceeds a predetermined level. Also, the drive means 45 may comprises a rotary solenoid, a servomotor, or a power cylinder which is operated in accordance with the engine speed.

The first valve 30 has a port timing control surface 50 of an arcuate concave shape formed on the inner end and directed toward the cylinder 16. Also, the second valve 32 has a closure surface 52 of an arcuate concave shape formed on its lower end and directed toward the cylinder 16. A curvature of the control surface 50 of the first valve 30 is equal to that of the closure surface 52 of the second valve 32, and the curvature of each of these control surfaces 50 and 52 is substantially equal to that of the inner peripheral surface of the cylinder 16.

Figure 5:
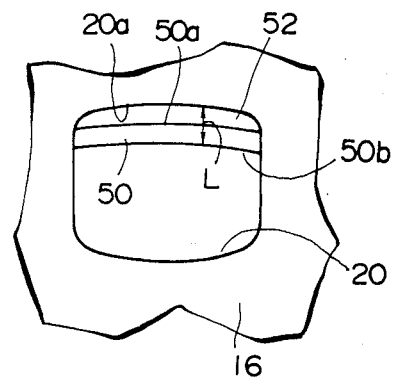
FIG. 5 is a view taken along the line V—V of FIG. 2.
Figure 4:
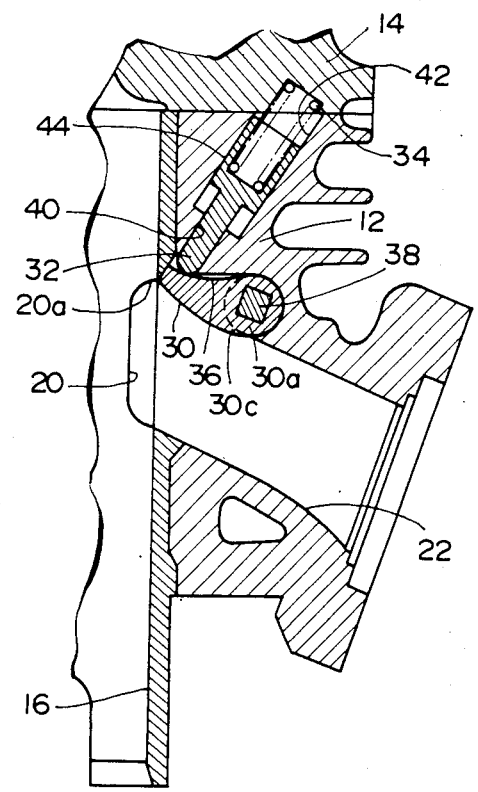
FIG. 4 is a view similar to FIG. 2 in an enlarged scale.

The angular movement of the drive shaft 38 causes the first valve 30 to angularly move between a retracted or open position (FIG. 4) where the first valve 30 is fully received in the recess 36 with its control surface 50 is retracted from the exhaust port 20 and an extended or closed position (FIGS. 2 and 5) where the first valve 30 is extended slightly from the recess 36 with its control surface 50 is disposed slightly below an upper edge 20a of the exhaust port 20 to close a part of the exhaust port 20. In the retracted position of the first valve 30, the second valve 32 is held by the first valve 30 in a retracted position against the bias of the coil spring 34 where the second valve 32 is fully received in the guide hole 40 with its closure surface 52 spaced from the exhaust port 20. As described above, the lower end of the second valve 32 is always urged into contact with the upper surface of the first valve 30 under the influence of the coil spring 34. Therefore, when the first valve 30 is angularly moved counterclockwise (FIG. 4) from its retracted to extended position, the second valve 32 sliding moves along a straight path, i. e., along the guide hole 40 downwardly from its retracted to extended position under the influence of the coil spring 34. In the extended position of the second valve 32, its closure surface 52 closes that portion of the exhaust port 20 lying between the upper edge 20a of the exhaust port 20 and the upper edge 50a of the control surface 50 of the first valve 30. Thus, the control surface 50 of the first valve 30 and the closure surface of second valve 32 cooperate with each other to close the upper portion of the exhaust port 20 when they are in their respective extended positions in which the two surfaces 50 and 52 are smoothly continuous with each other axially of the cylinder 16 and are also smoothly continuous with the inner surface of the cylinder 16 circumferentially thereof. It can be said that the effective upper edge of the exhaust port 20 is lowered to the lower edge 50b of the control surface 50 by a distance L as shown in FIG. 5.

In operation, in a lower range of the engine speed, the first and second valves 30 and 32 are held in their extended or closed positions to close the upper portion of the exhaust port 20 to delay the exhaust timing, thereby providing improved output power as indicated by a dots-and-dash line D in FIG. 1. When the engine speed reaches a predetermined level, the actuator 47 is operated to angularly move the first valve 30 through the drive shaft 38 from its extended to retracted position, with the second valve 32 sliding moving in synchronism with the first valve 30 and being brought into its retracted position, thereby fully opening the exhaust port 20. Thus, the engine 10 produces improved power output over an entire range of the engine speed.

The lower surface 30c of the first valve 30 is generally continuous with the surface of the exhaust passage 22 so as to serve as a part of the wall of the exhaust passage 22. The lower end of the second valve 32 is always urged into intimate contact with the upper surface of the first valve 30 adjacent to its control surface 50 throughout the entire width thereof as seen in FIG. 5, the exhaust port 20 is not communicated with a space 54 defined by the upper wall of the recess 36, the upper surface of the first valve 30 and the inner surface of the second valve 32. Therefore, the exhaust gas from the exhaust port 20 is not introduced into the space 54 during the operation of the engine 10, thereby enabling a smooth flow of the exhaust gas through the exhaust passage 22.

Figure 6:
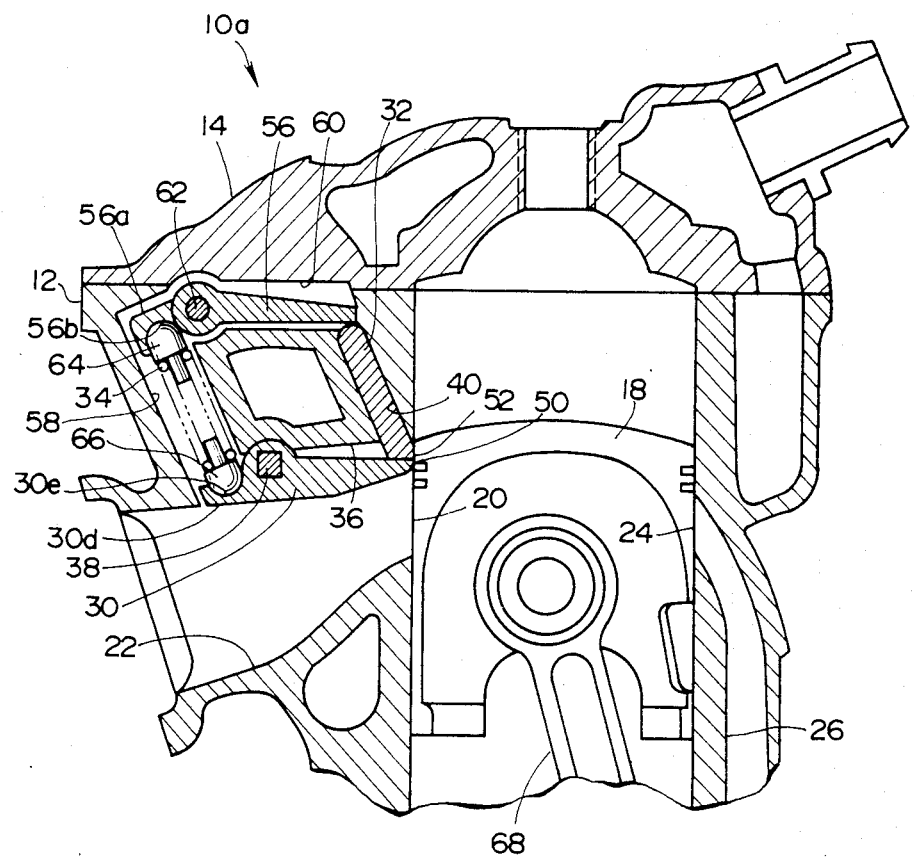
FIG. 6 is a cross-sectional view of a portion of a modified two-cycle engine.
Figure 7:
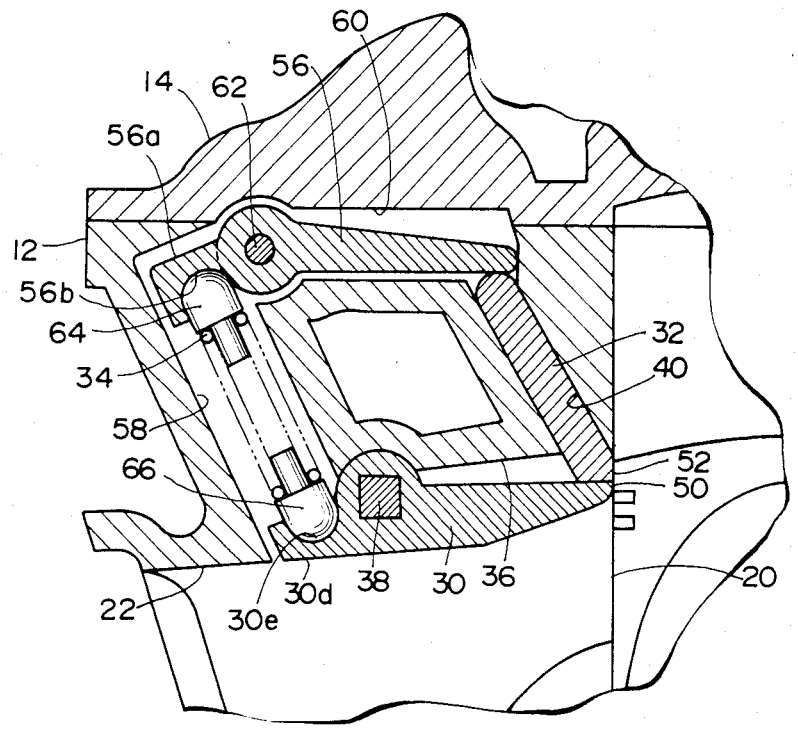
FIG. 7 is a view similar to FIG. 6 in an enlarged scale.
Figure 8:
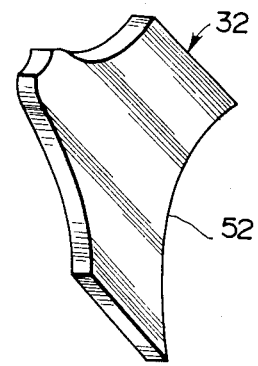
FIGS. 8 and 9 are perspective views of first and second valves of the port timing control means, respectively.
Figure 9:
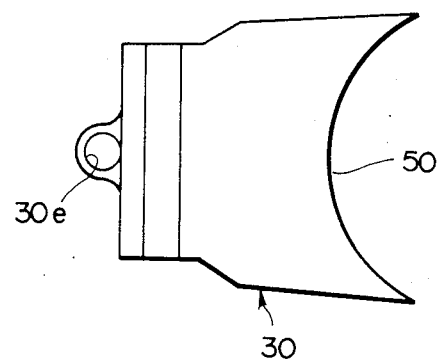

FIGS. 6 and 7 shows a modified two-cycle engine 10a which differs from the engine 10 of FIG. 2 mainly in that urging means 34 acts on a second valve 32 (FIG. 8) through a preload link 56 to hold the second valve 32 against a first valve (FIG. 9). More specifically, a first cavity 58 is formed in the cylinder block 12 in parallel relation to a guide hole 40 in which the second valve 32 is slidably received, the first cavity 58 opening at its lower end to a recess 36 in which the first valve 30 is received. A second cavity 60 is also formed in the cylinder block 12 and extends generally parallel to the recess 36, the second cavity 60 being disposed above the recess 36 and communicating with the guide hole 40 and the first cavity 58.

The preload link 56 is received in the second cavity 60 and is rotatably mounted at an outer end thereof on a shaft 62, supported on the cylinder block 12, for angular movement about the shaft 62, the shaft 62 being disposed parallel to the drive shaft 38. The preload link 56 has at an outer end a flange 56a extending away from the second valve 32 and having a downwardly-opening semi-spherical socket 56b. The first valve 30 also has at an outer end a flange 30d extending away from the second valve 32 and having an upwardly-opening semi-spherical socket 30e. Rounded ends of a pair of washers 64 and 66 are received respectively in the complementarily-shaped sockets 56b and 30e, and the urging means 34 in the form of a compression coil spring is received in the first cavity 58 and acts between the opposed washers 64 and 66 to urge the preload link 56 to angularly move about the shaft 62 in a clockwise direction (FIGS. 6 and 7), so that the front end of the preload link 56 is held against the upper end of the second valve 32. And, the lower end of the second valve 32 is held against the upper surface of the first valve 30 adjacent to its control surface 50 under the influence of the coil spring 34 via the preload link 56. Thus, the second valve 32 is carried by the first valve 30 and the preload link 56. The first valve 30, the second valve 32, the preload link 56 and the coil spring 34 are so disposed that they assume a generally parallelogrammic cross-section, as shown in FIGS. 6 and 7.

When the first valve 30 is angularly moved together with the drive shaft 38 clockwise from a retracted position to an extended position (FIGS. 6 and 7), the second valve 32 is also slidingly moved along the guide hole 40 downwardly from a retracted position to an extended position, so that the control surface 50 of the first valve 30 and the closure surface of the second valve 32 cooperate with each other to close the upper portion of the exhaust port 20 to delay the exhaust timing, as described above for the preceding embodiment of FIG. 2. And, when the engine speed reaches a predetermined level, the drive shaft 38 is angularly moved counterclockwise to bring the first and second valves 30 and 32 to their respective retracted positions to thereby fully open the exhaust port 20. When the first and second valves 30 and 32 are moved between their respective retracted and extended positions, the preload link 56 is angularly moved about the shaft 62, and the coil spring 34 is moved along the first cavity 58. A plane passing through axes of the shafts 38 and 62 is parallel to the second valve 32, and the coil spring 34 is parallel to the second valve 32 and the coil spring 34. With this arrangement, the distance between the flange 56a of the preload link 56 and the flange 30d of the first valve 30 is kept constant, and therefore the coil spring 34 is not changed in length, that is, not subjected to axial expansion and contraction, so that the second valve 32 is urged against the first valve 30 under a substantially constant load. Therefore, the first and second valves 30 and 32 can be moved smoothly. Thus, in this embodiment, since the bias or force of the compression coil spring 34 is not directly applied to the second valve 32, a torque required for angularly moving the drive shaft 38 for bringing the second valve 32 into its retracted position can be considerably reduced. Therefore, the load of the actuator 47 required for operating the drive shaft 38 can be reduced. In this embodiment, the compression coil spring 34 is disposed outwardly of the plane passing the axes of the shafts 38 and 62, but it may be replaced by a tension spring acting on the first valve 30 and the preload link 56 and disposed inwardly of the said plane.

Figure 10:
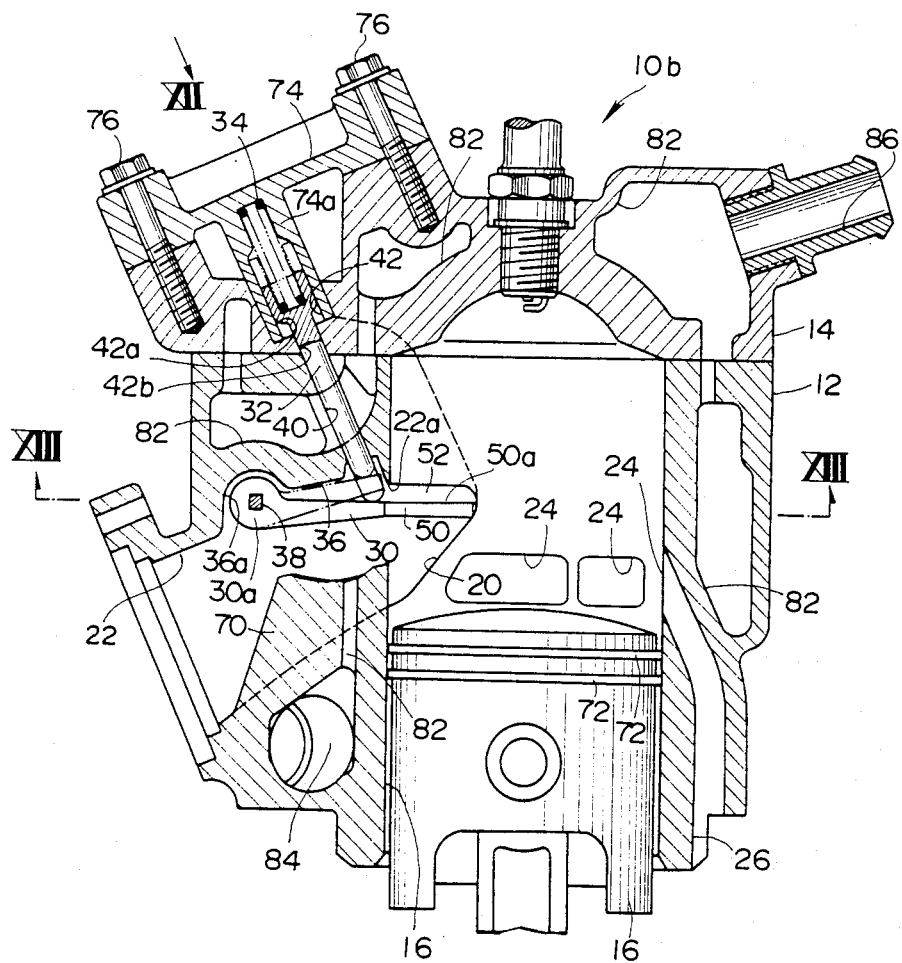
FIG. 10 is a cross-sectional view of a portion of another modified two-cycle engine.

FIG. 10 shows another modified two-cycle engine 10b which differs from the engine 10 of FIG. 2 mainly in that a partition wall or rib 70 extends between upper and lower portions of the wall of the exhaust passage 22 along the axis of the cylinder 16 centrally of the width of the exhaust port 20 and is disposed immediately adjacent to the exhaust port 20, so that the exhaust port 20 is divided by the partition wall 70 into a pair of first and second portions. And, in this embodiment, as a result of the provision of the partition wall 70, modified first and second valves 30 and 32 are provided.

The exhaust port 20 is relatively wide and extends generally half of the circumference of the cylinder 16 so that the engine 10b can produce an improved output power. An inner surface 70a of the partition wall 70 facing the cylinder 16 is disposed in contiguous relation to the exhaust port 20. The partition wall 70 serves not only to reinforce the exhaust port 20 and but also to prevent piston rings 72, mounted around the piston 18, from becoming radially expanded when passing through the exhaust port 20, thereby preventing the piston rings from damage by the upper and lower edges of the exhaust port 20 during the movement of the piston 18 along the cylinder 16.

Figure 11:
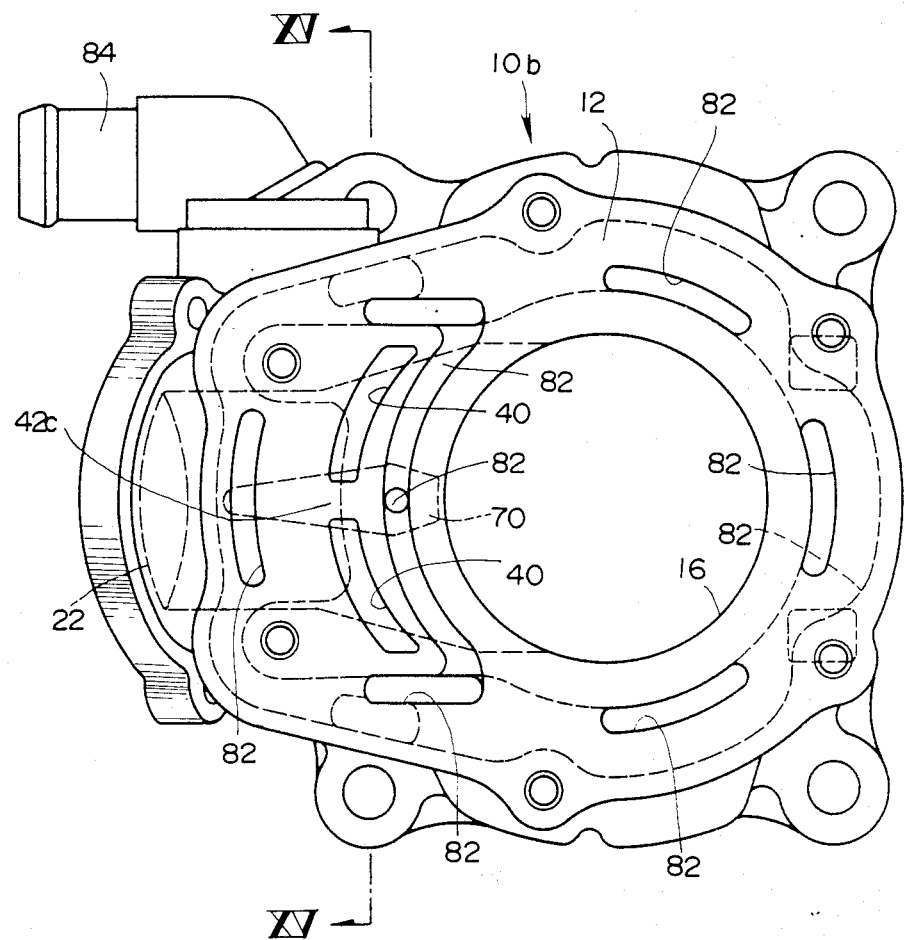
FIG. 11 is a plan view of the engine of FIG. 10 with a cylinder head removed.
Figure 12:
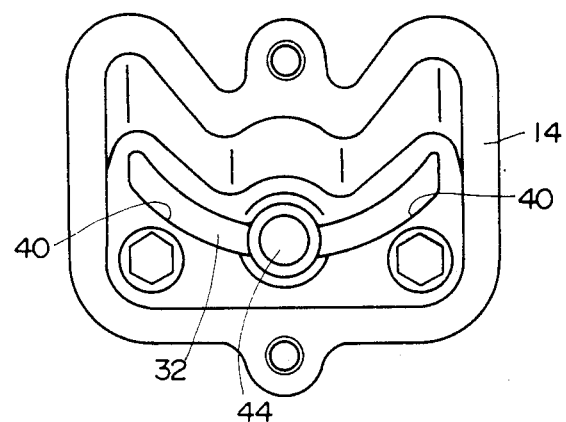
FIG. 12 is a view of a portion of the engine of FIG. 10 with a cover member removed, as viewed in a direction of an arrow XII of FIG. 10.

As described above for the engine 10 of FIG. 2, a recess 36 is formed in an upper wall of the exhaust port 20 and extending generally transversely of the cylinder. The partition wall 70 terminates short of a semi-circular receptive portion 36a of of the recess 36 and extends through the recess 36 along the axis of the cylinder 16 to divide a front portion of the recess 36, remote from the receptive portion 36a, into two sections. As best shown in FIGS. 11 and 12, a pair of juxtaposed guide holes 40 and 40 of an arcuate cross-section are formed in the cylinder block 12 and are spaced circumferentially of the cylinder 16, the guide holes 40 and 40 extending upwardly from the recess 36 in inclined relation to the axis of the cylinder 16, the pair of guide holes 40 and 40 opening to the above-mentioned two sections of the recess 36, respectively. Another guide hole 42 is formed in the cylinder head 14, the guide hole 42 having a main portion 42a of a circular cross-section and a bifurcated portion 42b which communicates with the main portion 42a and the pair of guide holes 40 and 40 at upper and lower ends, respectively. A cover member 74 is detachably secured to the cylinder head 14 by bolts 76 and has a tubular portion 74a which is fitted in the main portion 42a of the guide hole 42.

Figure 13:
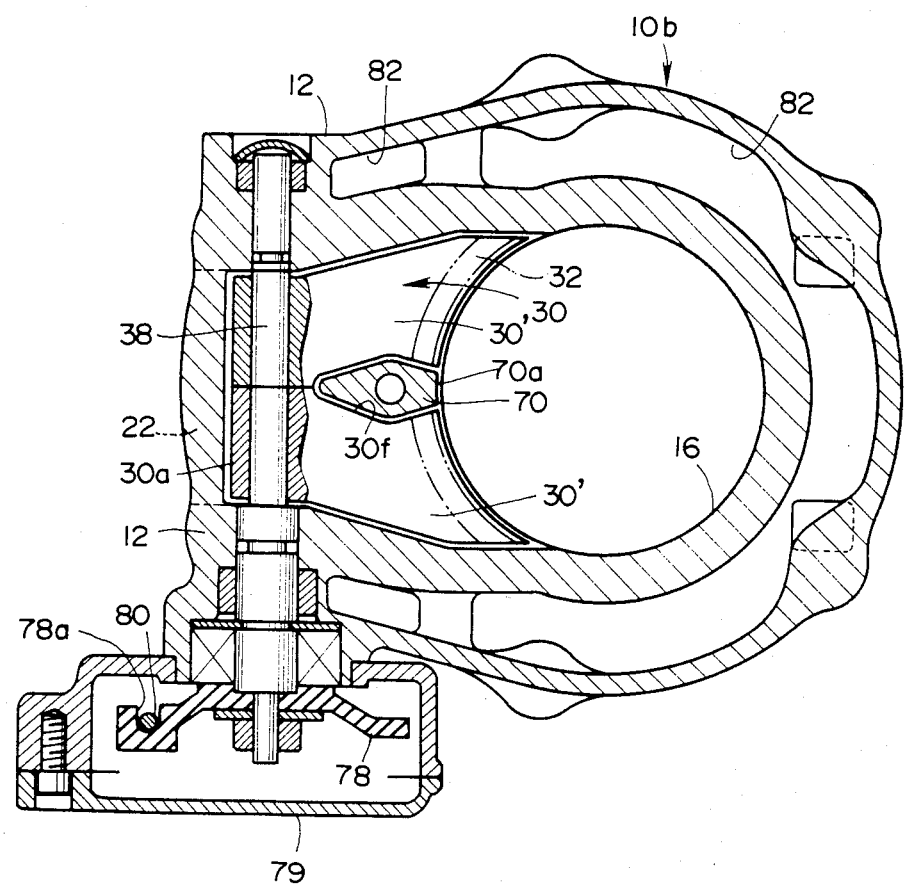
FIG. 13 is a cross-sectional view taken along the line XIII—XIII of FIG. 10.
Figure 14:
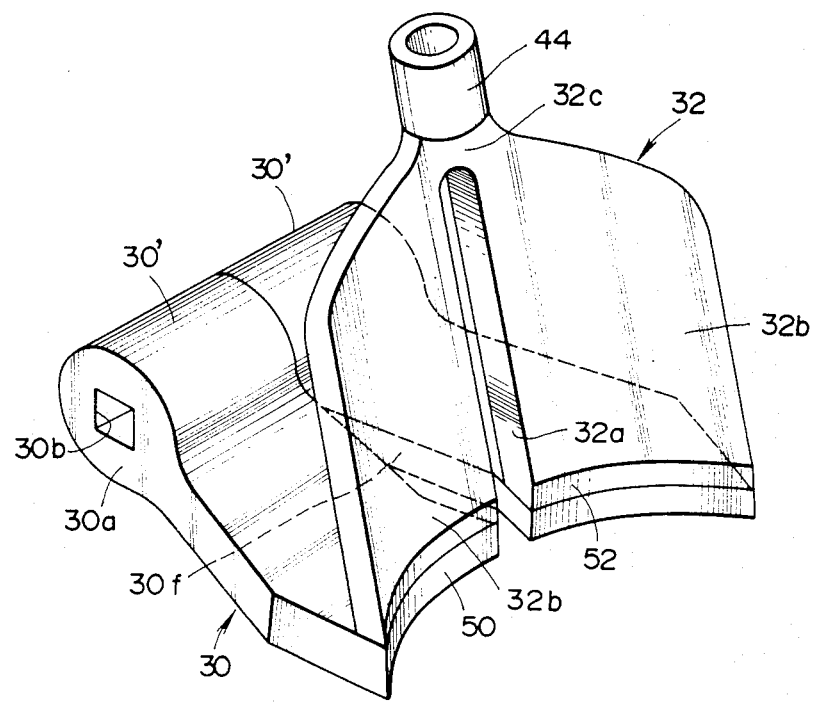
FIG. 14 is a perspective view of first and second valves incorporated in the engine of FIG. 10.

As described above for the engine 10 of FIG. 2, the first valve 30 in the form of a flap valve is received in the recess 36, and a drive shaft 38 passing through a bore 30b of a tubular portion 30a of the first valve 30. The first valve 30 has a slot 30f formed therethrough centrally of a width thereof as best shown in FIGS. 13 and 14 and opening to an inner end thereof, the slot 30f terminating short of the tubular portion 30a. The first valve 30 is comprised of two valve elements 30' and 30' which are held together in juxtaposed relation. The partition wall 70 is received in the slot 30f.

Figure 15:
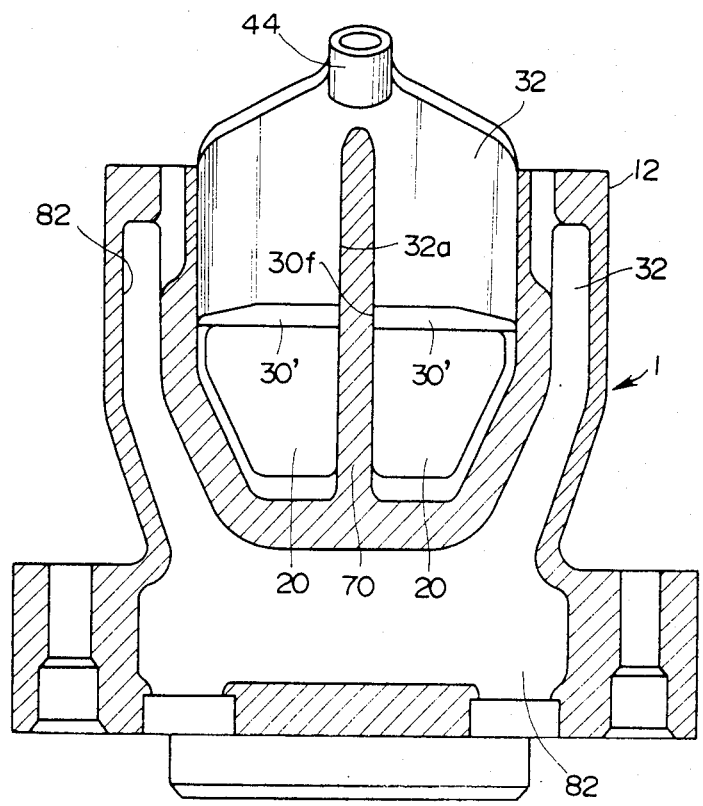
FIG. 15 is a cross-sectional view taken along the line XV—XV of FIG. 11.
Figure 16:
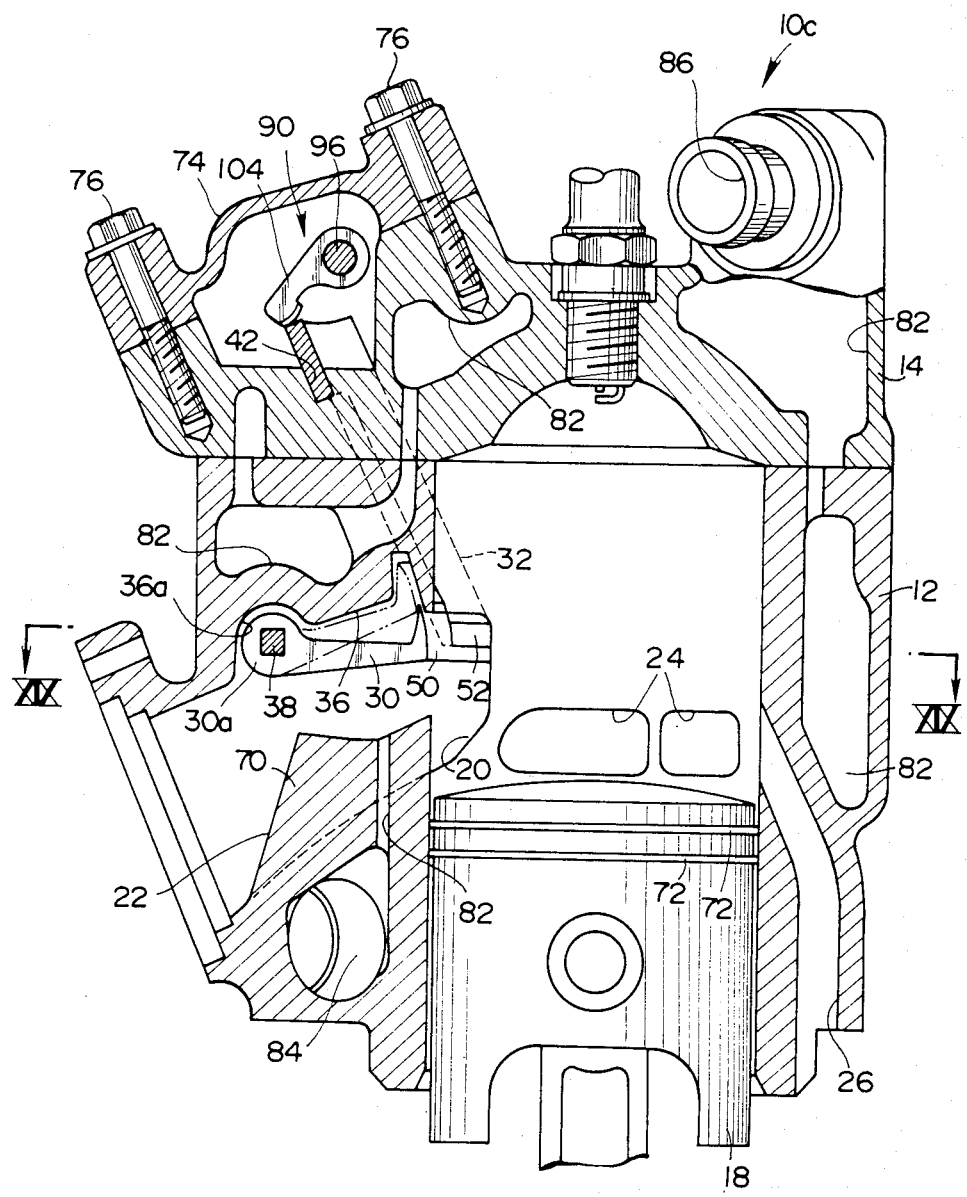
FIG. 16 is a cross-sectional view of a portion of a further modified two-cycle engine.
Figure 17:
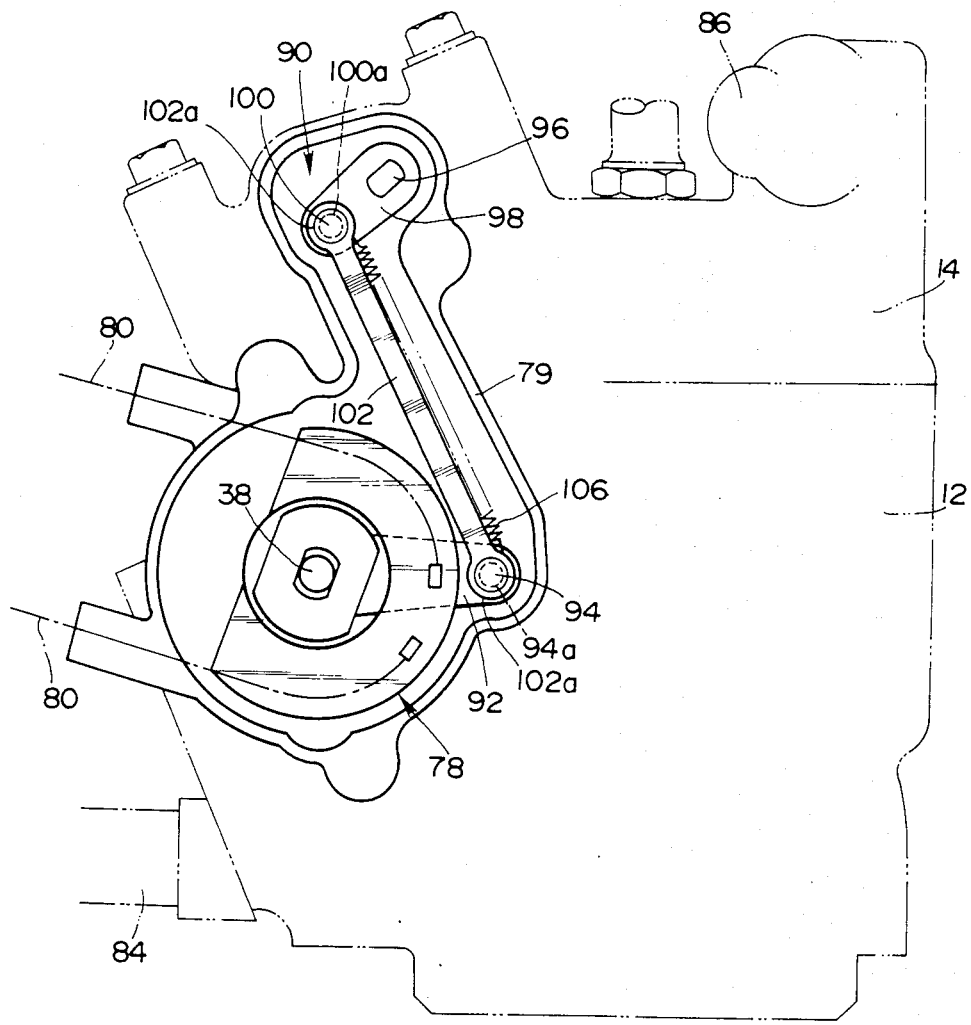
FIG. 17 is another cross-sectional view of the engine of FIG. 16.
Figure 18:
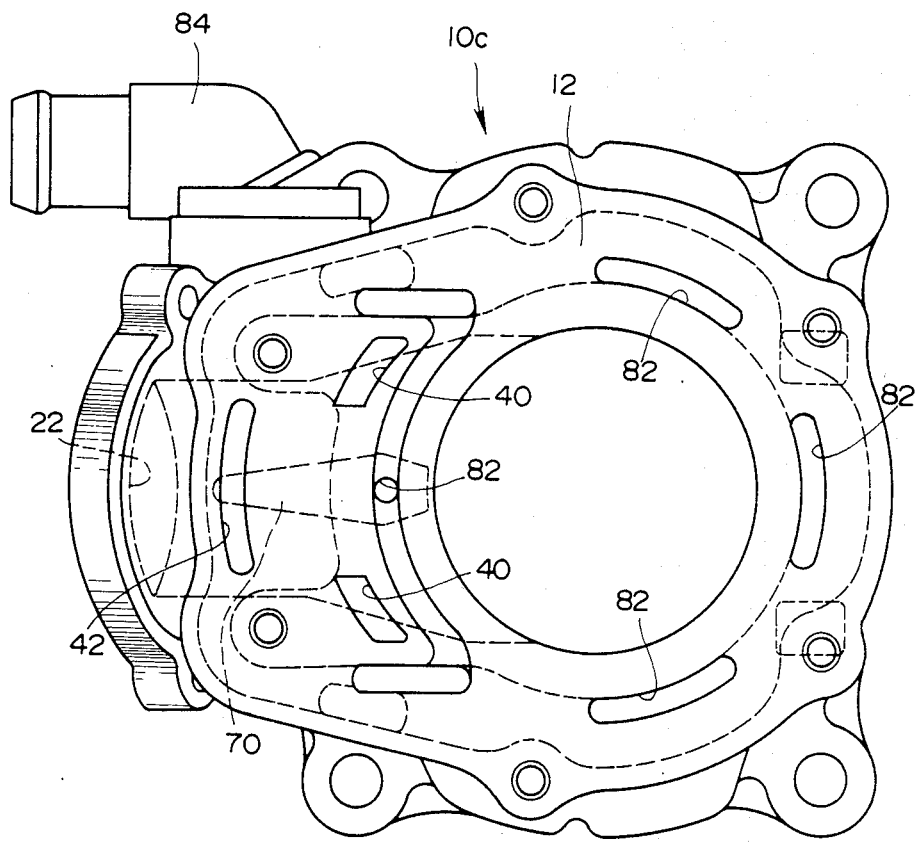
FIG. 18 is a plan view of the engine of FIG. 16 with a cylinder head removed.
Figure 19:
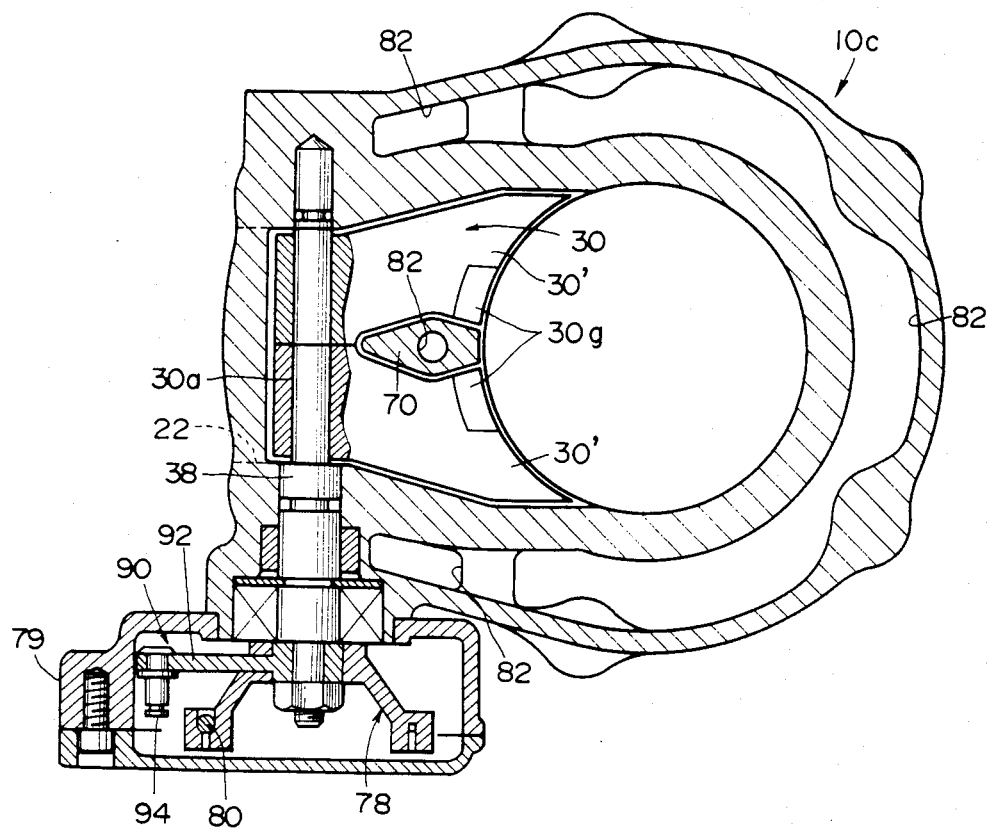
FIG. 19 is a cross-sectional view taken along the line XIX—XIX of FIG. 16.

The second valve 32 is in the form of an arcuate plate having a slot 32a formed therethrough centrally of a width thereof as best shown in FIGS. 14 and 15 and opening to a lower end thereof to provide a pair of spaced portions 32b and 32b. The second valve 32 has at its upper end an integral tubular portion 44 having an open top, and the slot 32a terminates short of the tubular portion 44 to provide a connective portion 32c interconnecting the spaced portions 32b and 32b at their upper ends. The second valve 32 is slidably received in the pair of guide holes 40 and 40 and the guide hole 42. More specifically, the pair of spaced portions 32b and 32b are slidably received respectively in the pair of guide holes 40 and 40 with the partition wall 70 received in the slot 32a. And, the tubular portion 44 is slidably received in the tubular portion 74a of the cover member 74, and narrower upper ends of the pair of spaced portions 32b and 32b are slidably received in the bifurcated portion 42b of the guide hole 42. A compression coil spring 34 acts between an upper wall of the tubular portion 74a of the cover member 74 and a bottom wall of the tubular portion 44 of the second valve 32 to always urge the lower end of the second valve 32 downwardly into sliding engagement with an upper surface of the first valve 30 immediately adjacent to its inner end.

As described above for the engine 10 of FIG. 2, the first valve 30 has a port timing control surface 50 of an arcuate concave shape formed on the inner end and directed toward the cylinder 16, but in this embodiment, the control surface 50 is interrupted by the slot 30f. Also, the second valve 32 has a closure surface 52 of an arcuate concave shape formed on its lower end and directed toward the cylinder 16, but in this case the closure surface 52 is also interrupted by the slot 32a.

As best seen in FIG. 13, one end of the drive shaft 38 extends exteriorly of the cylinder block 12, and a wire guide member 78 (see FIG. 20) fixedly mounted on the one end of the drive shaft 38 for rotation therewith. The wire guide member 78 is of a disc-shape having a cresent-shaped notch and has a peripheral guide groove 78a, and one end portions of a pair of operating wires 80 and 80 are received respectively in opposite end portions of the guide groove 78a and fixed at their one ends to the groove 78a. A casing 79 is removably attached to the cylinder block 12 and accommodates the wire-guide member 78. The other ends of the pair of operating wires 80 and 80 are operatively connected to the motor 47 of the reversible type. Upon rotation of the motor 47, the wire guide member 78 is angularly moved via the operating wires 80 and 80 together with the drive shaft 38.

As described above for the engine 10 of FIG. 2, the angular movement of the drive shaft 38 causes the first valve 30 to angularly move between a retracted or open position where the control surface 50 is retracted from the exhaust port 20 and an extended position where the control surface 50 is disposed slightly below an upper edge 20a of the exhaust port 20 to close a part of the exhaust port 20. The second valve 32 is movable in synchronism with the first valve 30 between a retracted and an extended position. And, in its retracted position of the second valve 32, its closure surface 52 closes that portion of the exhaust port 20 lying between the upper edge 20a of the exhaust port 20 and the upper edge 50a of the control surface 50 of the first valve. When the first and second valves 30 and 32 are in their extended positions, the control surface 50, the closure surface 52 and the inner surface 70a of the partition wall 70 facing the cylinder 16 are substantially smoothly continuous with one another circumferentially of the cylinder 16 to jointly close the upper portion of the exhaust port 20 completely. In the extended position of the second valve 32, the lower end of the connective portion 32c defining the upper end of the slot 32a is held against a branched point 42c of the bifurcated portion 42b of the guide hole 42, thereby positively limiting the downward movement of the second valve 32.

A plurality of water passageways 82 are provided in the cylinder block 12 and the cylinder head 14 adjacent to the cylinder 16, the exhaust passage 22 and the guide hole 40, and a cooling water of a cooling water circulation system flows through an inlet 84, the water passageways 82 and an outlet 86 leading to a radiator (not shown) to cool the cylinder 16, the exhaust passage 22 and the slidable second valve 32.

Since the first and second valves 30 and 32 have the respective slots 30f and 32a in which the partition wall 70 is slidably received, these two valves will not interfere with the partition wall 70 during the movement between their respective extended and retracted positions. In addition, the second valve 32 can be easily mounted in position and replaced by a new one by removing the cover member 74 from the cylinder head 14.

Figure 20:
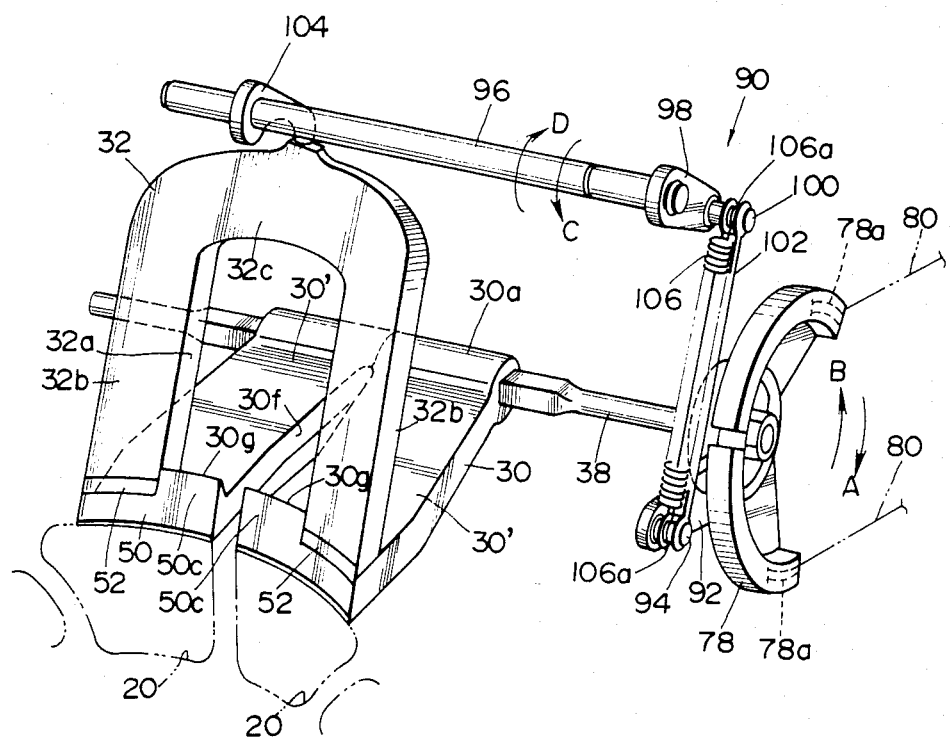
FIG. 20 is a perspective view of first and second valves, showing an operative connection between the two valves through linkage means.

FIG. 16 to 20 show a further modified engine 10c which differs from the engine 10b of FIG. 10 mainly that the compression coil spring 34 is replaced by linkage means 90 for moving a second valve 32 downwardly. More specifically, a first valve 30 is raised at its inner end adjacent to a slot 30f to provide a pair of projections 30g and 30g. The inner end faces 50c and 50c of these projections 30g constitute part of a control surface 50 which is interrupted by the slot 30f. The second valve 32 has a pair of portions 32a and 32a spaced by a slot 32a and connected together by a connective portion 32c at their upper ends, these spaced portions 32b and 32b being relatively narrow so that the second valve 32 assumes an inverted U-shape as best seen in FIG. 20. The projections 30g and 30g of the first valve 30 are received in the slot 32b of the second valve 32 at its open lower end.

The linkage means 90 for moving the second valve 32 will now be described. A lever 92 is fixedly mounted on the drive shaft 38 for rotation therewith and extending radially outwardly of the wire guide member 78. The lever 92 has an integral pin 94 at a free end thereof, and a shaft 96 is supported at opposite ends on the casing 79 and the cylinder block 12 for rotation about an axis thereof, the shaft 96 extending parallel to the drive shaft 38. One end of an arm member 98 is fixedly secured to one end of the shaft 96, and the arm member 98 has an integral pin 100 at the other end. Opposite ends of a rod 102 are rotatably connected to the pins 94 and 100, respectively. With this arrangement, when the wire guide member 78 is angularly moved together with the drive shaft 38 about an axis thereof in a direction A (FIG. 20), the shaft 96 is angularly moved about its axis in a direction C, and similarly the angular movement of the wire guide member 78 in the opposite direction B causes the angular movement of the shaft 96 in the opposite direction D.

An arm member 104 is fixedly mounted at one end on the other end of the shaft 96, and the other end of the arm member 104 is held in engagement with the upper end of the connective portion 32c of the second valve 32. A tension spring 106 extends between the two pins 94 and 100 to eliminate a play between the rod 102 and each pin, thereby eliminating a play or backlash between the lever 92 and the arm 98. The tension spring 106 has a pair of hooks 106a at opposite ends which are received respectively in opposite bifurcated ends 102a of the rod 102 and engaged respectively in peripheral grooves 94a and 100a of the pins 94 and 100, thereby preventing the rod 102 from becoming disengaged from the pins 94 and 100.

When the wire guide member 78 is angularly moved in the direction B (FIG. 20) together with the drive shaft 38, the shaft 96 is angularly moved in the direction D, so that the second valve 32 is urged downwardly into its extended position through the arm member 104. At this time, since the drive shaft 38 is also angularly moved in the direction B in synchronism with the shaft 96, the first valve 30 is angularly moved into its extended position. In the extended positions of the first and second valves 30 and 32, the control surface 50 of the first valve 30 and the closure surface 52 of the second valve 32 are smoothly continuous with each other axially of the cylinder 16, and the inner end faces 50c and 50c of the projections 30g and 30g are smoothly continuous with the closure surface 52 circumferentially of the cylinder 16. And, the control surface 50 and the closure surface 52 are substantially smoothly continuous with the inner peripheral surface of the cylinder 16 circumferentially thereof, thereby closing the upper portion of the exhaust port 20 to delay the exhaust timing, as described above for the preceding embodiments. When the engine speed reaches a predetermined level, the wire guide member 78 is angularly moved in the direction A together with the drive shaft 38, and the shaft 96 is angularly moved in the direction C, so that the first and second valves 30 and 32 are brought into their respective retracted positions to fully open the exhaust port 20.

By virtue of the provision of the linkage means 90, the second valve 32 is positively moved downwardly into its extended position even if carbon in the exhaust gas is deposited on the second valve 32 and the surfaces of the guide holes 40. In addition, since the linkage means 90 is operatively connected to the drive shaft 38 which drives the first valve to move, the first and second valves 30 and 32 are operated to moved accurately in synchronism with each other.

While the two cycle-engines according to the present invention have been specifically shown and described herein, the invention itself is not to be restricted to the exact showing of the drawings or the description thereof. For example, although the first and second valves are moved between the respective two positions, that is, extended and retracted positions, the positions of the first and second valves can be continuously varied in accordance with the engine speed.

What is claimed is:

1. A two-cycle engine comprising:
   (a) a cylinder block having a cylinder head thereon, said cylinder block having a cylinder having an axis, an exhaust port being formed in a side wall of said cylinder and having opposite ends spaced along the axis of said cylinder, and said cylinder block having an exhaust passage communicating with said exhaust port;
   (b) a piston received in said cylinder for reciprocal movement along the axis of said cylinder for closing and opening said exhaust port; and
   (c) port timing control means for varying a timing of the opening of said exhaust port by said piston, said port timing control means comprising (i) a first valve mounted within said exhaust passage adjacent to one end of said exhaust port closer to said cylinder head and having a port timing control surface, (ii) a second valve mounted on said cylinder block between said cylinder head and said first valve and having a closure surface, and (iii) urging means acting on said second valve to always urge it against said first valve, said first valve being operable to be angularly moved about an axis generally perpendicular to the axis of said cylinder into and out of an extended position where said control surface is disposed slightly below said one end of said exhaust port to close a part of said exhaust port, said second valve being movable along a generally straight path into and out of an extended position where said closure surface closes that portion of said exhaust port lying between said one end of said exhaust port and said first valve, said second valve being movable in synchronism with the angular movement of said first valve through said urging means.

2. A two-cycle engine comprising:
(a) a cylinder block having a cylinder head thereon, said cylinder block having a cylinder having an axis, an exhaust port being formed in a side wall of said cylinder and having opposite ends spaced along the axis of said cylinder, and said cylinder block having an exhaust passage communicating with said exhaust port;
(b) a piston received in said cylinder for reciprocal movement along the axis of said cylinder for closing and opening said exhaust port; and
(c) port timing control means for varying a timing of the opening of said exhaust port by said piston, said port timing control means comprising (i) a first valve mounted within said exhaust passage adjacent to one end of said exhaust port closer to said cylinder head and having a port timing control surface, (ii) a second valve mounted on said cylinder block between said cylinder head and said first valve and having a closure surface, and (ii) linkage means operatively connecting said first valve to said second valve, said first valve being operable to be angularly moved about an axis generally perpendicular to the axis of said cylinder into and out of an extended position where said control surface is disposed slightly below said one end of said exhaust port to close a part of said exhaust port, said second valve being movable along a generally straight path into and out of an extended position where said closure surface closes that portion of said exhaust port lying between said one end of said exhaust port and said first valve, and said second valve being movable in synchronism with the angular movement of said first valve through said linkage means.

3. A two-cycle engine according to claim 1 or claim 2, in which said control surface and said closure surface are of an arcuate concave shape and having a curvature substantially equal to an inner peripheral surface of said cylinder.

4. A two-cycle engine according to claim 3, in which said first and second valves are in the form of a plate having opposite ends, said first valve being disposed transversely of said cylinder, said first and second valves have said control and closure surfaces at the respective one ends, respectively, said second valve being held at the one end thereof against one side of said first valve, directed to said cylinder head, adjacent to the one end thereof.

5. A two-cycle engine according to claim 4, in which a recess is formed in said cylinder block adjacent to said one end of said exhaust port and opening to said exhaust passage, a guide hole being formed in said cylinder block and extending in inclined relation to the axis of said cylinder, said guide hole opening to said recess adjacent to said exhaust port, said first valve being received in said recess, the other side of said first valve being generally continuous with a wall defining said exhaust passage, and said second valve being received in said guide hole for sliding movement therealong.

6. A two-cycle engine according to claim 1 or 2, in which said port timing control means comprises drive means for driving said first control valve for angular movement in accordance with the speed of said engine.

7. A two-cycle engine according to claim 1, in which said first and second valves are in the form of a plate, said first valve being disposed transversely of said cylinder, there being provided a preload link mounted on said cylinder block for angular movement about an axis parallel to the axis of angular movement of said first valve, said urging means acting between said first valve and said preload link for urging said preload link toward said first valve to hold said second valve between said preload link and said first valve.

8. A two-cycle engine according to claim 7, in which said first valve and said preload link is disposed generally parallel to each other, said second valve being disposed generally parallel to a plane passing through the axes of angular movement of said first valve and said preload link.

9. A two-cycle engine according to claim 1, in which said first and second valves are in the form of a plate having opposite ends, said first valve being disposed transversely of said cylinder, said first and second valves have said control surface and said closure surface at their one ends, respectively, said second valve being held at the one end thereof against said second valve adjacent to the one end thereof, said cylinder block having a partition wall provided in said exhaust passage immediately adjacent to said exhaust port and extending along the axis of said cylinder to divide said exhaust port into two sections juxtaposed circumferentially of said cylinder, each of said first and second valves having a slot opening to a respective one of the one ends thereof to interrupt a respective one of said control surface and said closure surface, said partition wall being fitted in said slots of said first and second valves in a manner to enable the angular movement of said first and the movement of said second valve along the straight path.

10. A two-cycle engine according to claim 9, in which the one end of said first valve is raised adjacent to its slot, said raised end of the first valve being received in the open end of said slot of said second valve.

11. A two-cycle engine according to claim 2, in which said first valve is fixedly mounted on a drive shaft mounted on said cylinder block for angular movement about an axis thereof, drive means being operatively connected to said drive shaft for driving it for angular movement in accordance with the speed of the engine whereby said first valve is angularly moved into and out of its extended position, a second shaft being mounted on the cylinder block for angular movement about an axis thereof and having an arm fixedly mounted thereon for angular movement therewith, said arm being engaged with said second valve, said drive shaft being operatively connected to said second shaft for angular movement in synchronism with the angular movement of said second shaft.

* * * * *